United States Patent
Hessing et al.

(10) Patent No.: US 7,072,676 B1
(45) Date of Patent: Jul. 4, 2006

(54) METHOD AND WIRELESS TRANSCEIVER FOR REQUESTING AND PROCESSING INFORMATION

(75) Inventors: Bernd Hessing, Holle (DE); Stefan Goss, Hildesheim (DE); Oliver Hartkopp, Peine (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/856,989

(22) PCT Filed: Nov. 23, 1999

(86) PCT No.: PCT/DE99/03659

§ 371 (c)(1),
(2), (4) Date: Sep. 7, 2001

(87) PCT Pub. No.: WO00/33278

PCT Pub. Date: Jun. 8, 2000

(30) Foreign Application Priority Data

Nov. 30, 1998 (DE) .................................. 198 55 230

(51) Int. Cl.
*H04Q 7/20* (2006.01)
*H04M 1/00* (2006.01)
*H04B 17/00* (2006.01)
*G06F 11/00* (2006.01)

(52) U.S. Cl. ............... 455/466; 455/456.5; 455/456.6; 455/550.1; 455/517; 455/67.11; 370/242; 370/252

(58) Field of Classification Search .............. 455/550.1, 455/67.11, 517, 67.16, 69, 424–425, 466, 455/456.3, 456.5, 456.6, 95, 96, 99, 500.1; 370/242, 249, 252, 253, 333, 350; 340/995.13, 340/995.18, 995.19

See application file for complete search history.

(56) References Cited

U.S. PATENT DOCUMENTS

| | | | | |
|---|---|---|---|---|
| 5,774,479 A | | 6/1998 | Lee et al. | |
| 5,774,803 A | * | 6/1998 | Kariya | 455/414 |
| 5,911,773 A | * | 6/1999 | Mutsuga et al. | 701/200 |
| 6,091,961 A | * | 7/2000 | Khalil | 455/466 |
| 6,104,316 A | * | 8/2000 | Behr et al. | 340/995 |
| 6,107,944 A | * | 8/2000 | Behr et al. | 340/995 |
| 6,169,515 B1 | * | 1/2001 | Mannings et al. | 342/357.1 |
| 6,304,753 B1 | * | 10/2001 | Hartmaier | 455/413 |
| 6,304,758 B1 | * | 10/2001 | Ierbig et al. | 455/456 |
| 6,351,647 B1 | * | 2/2002 | Gustafsson | 455/466 |
| 6,438,380 B1 | * | 8/2002 | Bi et al. | 455/456 |
| 6,556,835 B1 | * | 4/2003 | Raivisto | 455/466 |

FOREIGN PATENT DOCUMENTS

| | | |
|---|---|---|
| WO | WO 96/35198 | 11/1996 |
| WO | WO 97/01940 | * 1/1997 |
| WO | WO 97/36434 | 10/1997 |
| WO | WO 98/26395 | 6/1998 |
| WO | WO 98/38618 | 9/1998 |

OTHER PUBLICATIONS

GSM Standard, RE/SMG–040340PR4, Oct. 1996.
European Preliminary Standard ENV–278–4–1–0012, Jun. 1996.

* cited by examiner

*Primary Examiner*—William Trost
*Assistant Examiner*—Meless Zewdu
(74) *Attorney, Agent, or Firm*—Kenyon & Kenyon

(57) ABSTRACT

A method and a wireless transceiver are used for requesting and processing information. A first information query is transmitted by the wireless transceiver and information is returned by a service provider via a wireless network to the requesting wireless transceiver. The information query is provided with a predefined first validity time value and the returned information, in particular in the form of short messages, is provided with a predefined second validity time value by the service provider.

40 Claims, 3 Drawing Sheets

US 7,072,676 B1

METHOD AND WIRELESS TRANSCEIVER FOR REQUESTING AND PROCESSING INFORMATION

FIELD OF THE INVENTION

The present invention related to a method and wireless transceiver for requesting and processing information.

BACKGROUND INFORMATION

PCT Published Patent Application WO 98/26395 describes a method for traffic information in which data is transmitted upon request and/or automatically between a central unit and a mobile subscriber unit, and in which the data contains traffic information which is output upon request and/or automatically by the mobile subscriber unit to the subscriber.

SUMMARY OF THE INVENTION

The method according to the present invention provides that information queries transmitted by a wireless transceiver to a service provider and the information returned by the service provider are provided with predefined validity time values. Thus, the maximum time period for obtaining information can be calculated even when no data selection connection or the like is possible or convenient.

In embodiments of the present invention, the information queries are transmitted as short messages over a wireless network, for example, a mobile wireless network, and the information queries are provided with a first validity time value. When the validity time value is exceeded but the information query has not yet been transmitted to the service provider, the information query is automatically deleted in the wireless network and thus it cannot initiate any information to be returned by the service provider. This contributes to simplified error processing of the method according to the present invention and in a simplified design of the wireless transceiver according to the present invention. Furthermore, the returned information is also received in the form of short messages, SMS messages in accordance with the GSM standard in particular, the returned information being provided with a second validity time value by the service provider which also contributes to simplified error processing, in particular in the case of communication disturbances.

In further embodiments of the present invention, the wireless transceiver includes means for determining its position, in particular in a road network. Thus, information queries can be requested depending on the position of the wireless transceiver.

In further embodiments of the present invention, the information queries are generated on the basis of the position of the wireless transceiver. Thus, obtaining information is simplified, for example, reducing the amount of information to be transmitted.

In further embodiments of the present invention, a message is generated in the wireless transceiver and/or the use of the information returned by the central station to the wireless transceiver is suppressed if a first predefined time period has been exceeded after the first information query has been transmitted. This makes it possible to respond to the fact that information was received with a delay, for example, by calling a user's attention to this fact and/or by ignoring the returned information, for example, if this information has become obsolete and therefore no longer relevant due to a long time delay in the transmission of information for processing, for example, for the navigation of a motor vehicle.

In further embodiments of the present invention, after a first information query, a second subsequent information query is automatically transmitted after a second predefined time period has been exceeded, the second predefined time period being started at the time of the first information query, the first predefined time period which causes the returned information to be suppressed after it has been exceeded being restarted at the time of the second information query, and the second predefined time period being greater than the first predefined time period. This makes it possible to send out information queries repeatedly and to keep the information processing, for example, for calculating the most favorable route of a vehicle in the presence of traffic problems on certain road segments, permanently up-to-date through the returned information. Furthermore, by using automatic information queries, it is also possible to keep the processed information constantly up-to-date without user intervention, resulting in a higher degree of operating reliability of the method according to the present invention and the wireless transceiver according to the present invention for requesting and processing information, in particular when the user is performing some activity, for example, driving a vehicle.

In further embodiments of the present invention, a second information query following the first information query in time is transmitted upon user request, the first predefined time period being restarted at the time the second information query is issued. Thus, an information query can be sent upon user request, which may be desirable in the event of unexpected changes in the situation, for example, a change in destination. In addition, the number of information queries in the case of an information query upon user request can be kept lower and information queries can be transmitted in a controlled manner, for example, before a decision to be made, in particular regarding road conditions, resulting in reduced telecommunications traffic and reduced costs when the information queries are associated with costs.

In further embodiments of the present invention, the returned information contains traffic situation reports, in particular according to the TMC standard, and the traffic situation reports may relate to one or more specific areas. Thus, only those traffic situation reports are taken into consideration in the wireless transceiver which, for example, are or may become relevant for the navigation to be performed, since they concern areas which correspond to areas queried in the information query or are adjacent thereto, for example.

In further embodiments of the present invention, the life of the traffic situation reports exceeds a predefined minimum life. The traffic situation reports contained in the returned information are therefore received in all cases.

In further embodiments of the present invention, the predefined minimum life of the traffic situation reports is greater than the sum of the predefined first time period and the predefined second time period. Traffic situation reports contained in returned information can thus not be ignored because of their excessively short life alone during information processing. Thus, no short-term loss of traffic situation reports occurs in the wireless transceiver in the case of a time spread in obtaining the messages.

In further embodiments of the present invention, a number of appropriate and relevant traffic situation reports is selected from the amount of traffic situation reports received, and is made available to a processing unit, in particular a navigation unit. This can reduce the processing costs by concentrating on the relevant traffic situation reports, making processing speedier, allowing the hardware and the software to be kept simpler, thus reducing costs.

In further embodiments of the present invention, a wireless transceiver includes a memory in which received traffic situation reports can be stored. Thus, the traffic situation reports can be read individually from returned information. The traffic situation reports can be used without all the returned information being fully available in the case of a plurality of returned information items received by the wireless transceiver. The method according to the present invention and the wireless transceiver according to the present invention are compatible with receiving traffic situation reports via a unidirectional communication channel, for example, via radio; broadcast SMS, or the like. Furthermore, traffic situation reports can thus be used in a practical manner when the respective returned information is not fully available In further embodiments of the present invention, the wireless transceiver includes means for selecting navigation messages from the traffic situation reports and for making them available to a navigation unit. This reduces the resources needed in the navigation unit.

DETAILED DESCRIPTION

Figure 1:
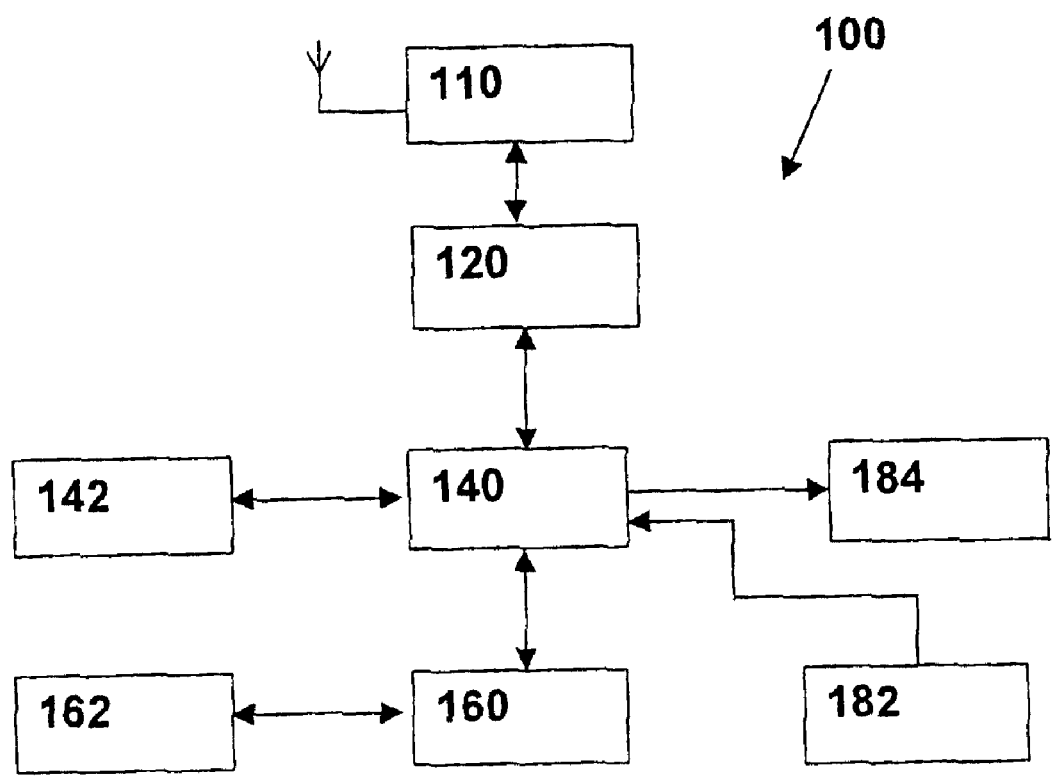
FIG. 1 shows a block diagram of a wireless transceiver embodiment according to the present invention.

FIG. 1 shows a block diagram of a wireless transceiver 100. Wireless transceiver 100 includes a transceiver unit 110, which is connected to an analyzer circuit 120. Analyzer circuit 120 is connected to a distributor device 140. Furthermore, a memory 142, a navigation unit 160, playback devices 184, and input devices 182 are connected to distributor device 140. Navigation unit 160 is also connected to a navigation data memory 162. Transceiver unit 110 can be designed, in particular, so that it includes a receptacle for a portable telecommunications terminal, for example, a cell phone, so that transceiver unit 110 cannot be operated until the portable telecommunications terminal is connected to transceiver unit 110, for example, plugged in or the like. The different units and devices of wireless transceiver 100 can be distributed among different housings or integrated in a single housing. Individual units and devices of wireless transceiver 100 can be combined with an additional device in a housing. Thus, for example, input devices 182 and playback devices 184 can be integrated into a wireless receiver. In this case, the wireless receiver is connected to wireless transceiver 100 via a wire-bound or wireless connection, for example, a CAN bus or the like. The wireless receiver is provided with a decoder for traffic situation reports, in particular, according to the RDS-TMC system, so that the traffic situation reports can be received by the wireless transceiver via the link between the wireless transceiver and the radio receiver.

Figure 2:
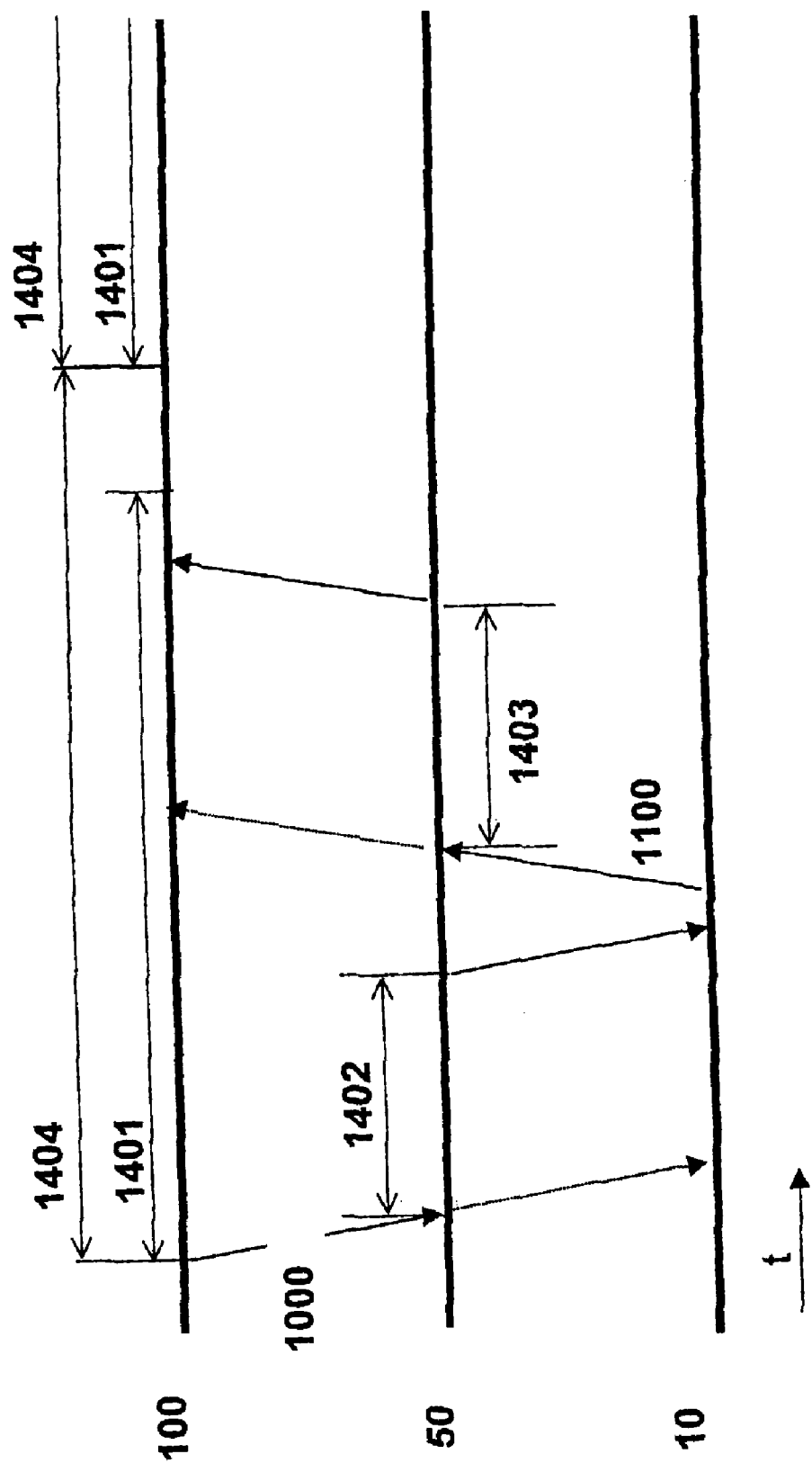
FIG. 2 shows a transmit/receive diagram according to an embodiment of the method according to the present invention and the mode of operation of the wireless transceiver according to the present invention between the wireless transceiver, a wireless network, and a service provider.

FIG. 2 shows the communication process over time according to an embodiment of the method according to the present invention and the mode of operation of wireless transceiver 100 according to the present invention between the wireless transceiver 100, a wireless network 50, and a service provider 10 with the aid of a transmit/receive diagram. A first information query 1000 is transmitted by wireless transceiver 100 to wireless network 50 to be forwarded to service provider 10. First information query 1000 is provided by wireless transceiver 100 with a first validity time value 1402. First validity time value 1402 causes first information query 1000 no longer to be able to be transmitted to service provider 10 after the lapse of first validity time value 1402. If first information query 1000 was not transmitted to service provider 10 over wireless network so during the time period of first validity time value 1402, first information query 1000 is lost.

When first information query 1000 has been successfully transmitted to service provider 10, service provider 10 processes the contents of first information query 1000 and, after a certain processing time, returns one or more items of information 1100 to wireless transceiver 100 over wireless network 50. Service provider 10 provides returned information 1100 with a second validity time value 1403, which specifies the time period during which returned information 1100 is kept available in network 50 for transmission to wireless transceiver 100. If returned information 1100 is held available in wireless network 50 during a time period specified by second validity time value 1403 without returned information 1100 being transmitted to wireless transceiver 100, returned information 1100 is lost. If returned information 1100 is transmitted to wireless transceiver 100 within a time period specified by second validity time value 1403, wireless transceiver 100 can process returned information 1100. This takes place if first predefined time period 1401 has not been exceeded since the time when first information query 1000 was registered. If returned information 1100 was not received until after the lapse of first predefined time period 1401 after first information query 1000 was issued by wireless transceiver 100, a message is generated and/or processing of information 1100 which was returned too late is suppressed. The message can be forwarded in wireless transceiver 100 via distributor device 140 to playback devices 184 and output to a user there. The present invention further allows forwarding the message to navigation unit 160 or the like.

According to a method according to the present invention and wireless transceiver 100 according to the present invention, a second information query 1001 following first information query 1000 in time is transmitted by wireless transceiver 100 to service provider 10 over wireless network 50. Second information query 1001 can be issued due to a plurality of events, for example, automatically or also upon user request.

Second information query 1001 is transmitted automatically when a second predefined time period 1404 is exceeded. Second predefined time period 1404 is started at the time of first information query 1000. First predefined time period 1401 is restarted at the time of second information query 1001. Furthermore second predefined time period 1404 is greater than first predefined time period 1401. When information queries 1000, 1001 are automatically repeated, any desired number of additional information queries, which may have different contents, can be transmitted. Between two successive information queries 1000, 1001, the earlier information query is referred to as first information query 1000 and the subsequent information query is referred to as second information query 1001. First and second predefined time periods 1401, 1404-are both started at the time of first information query 1000. Since first predefined time period 1401 is smaller than second predefined time period 1404, first predefined time period 1401 ends while second predefined time period 1404 continues. After the lapse of second predefined time period 1404, second information query 1001 is issued and both the first and second predefined time periods 1401, 1404 are restarted.

Figure 3:
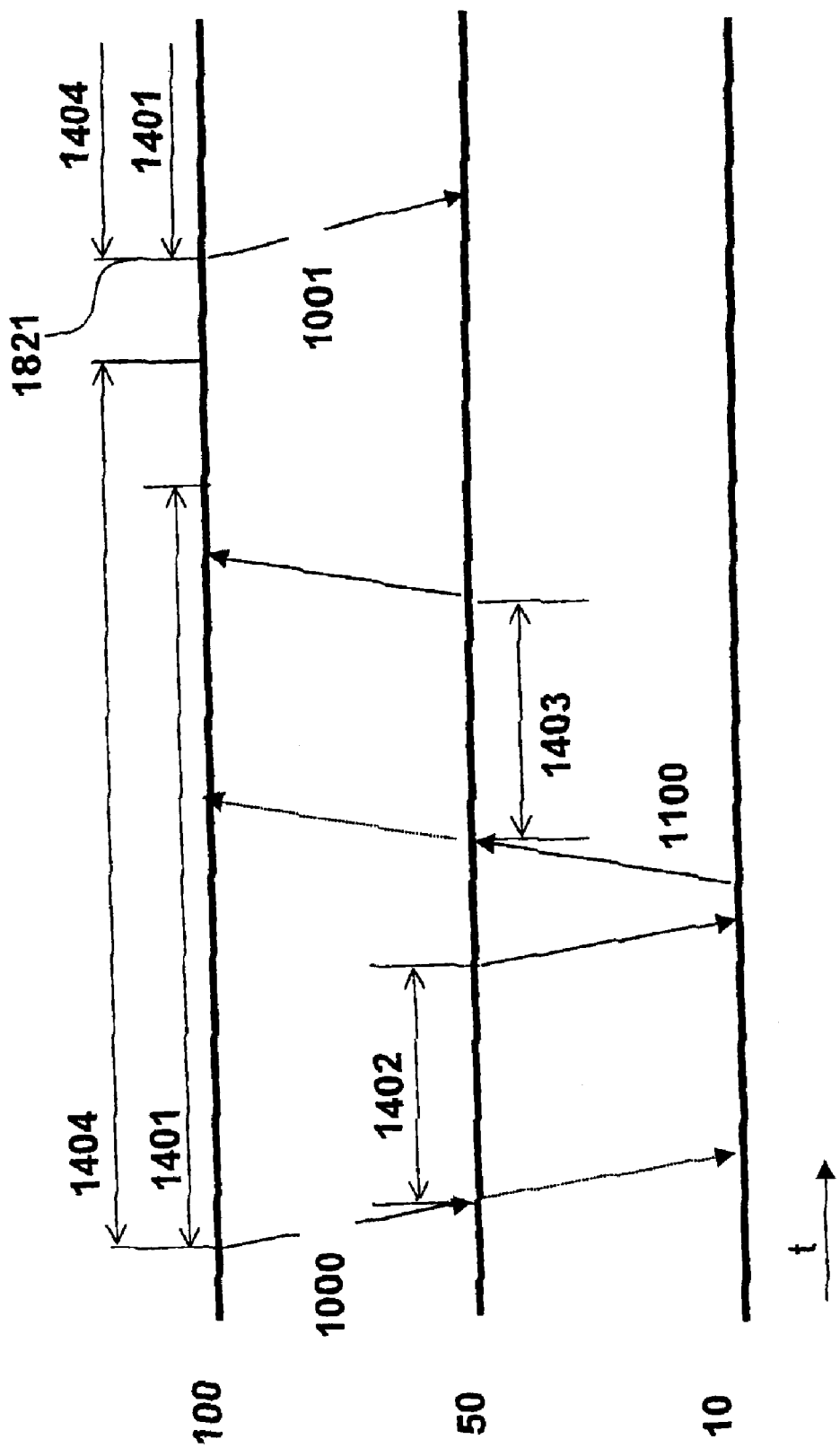
FIG. 3 shows a transmit/receive diagram according to a an embodiment of the method according to the present invention and the mode of operation of the wireless transceiver according to the present invention between the wireless transceiver, a wireless network, and a service provider.

FIG. 3 shows the communication process over time according to another embodiment of the method according to the present invention, and the mode of operation of wireless transceiver 100 according to the present invention between a wireless transceiver 100, a wireless network 50, and a service provider 10 with the aid of a transmit/receive diagram. The same reference symbols from FIG. 2 refer to similar segments of the method. Information queries 1000, 1001 can also be initiated by a user request 1821. Between two successive information queries 1000, 1001, the earlier information query is again referred to as first information query 1000 and the subsequent information query is referred to as second information query 1001. Since user request 1821, rather than second predefined time period 1404 being exceeded, is used as a criterion for initiating second information query 1001, the second predefined time period does not have to be started at the time of first information query 1000 in the present embodiment. At the time of first information query 1000, only first predefined time period is 1401 is started and it is restarted when second information query 1001 is issued.

Wireless transceiver 100 according to the present invention is suitable for performing the method according to the present invention. Transceiver unit 110 transmits first information query 1000 over wireless network 50 to service provider. 10. In a first timer assigned to analyzer circuit 120, a first clock is started when first information query 1000 is issued by transceiver unit 110. Returned information 1100 is analyzed by the analyzer circuit. The contents of returned information 1100 can be stored in memory 142 using distributor device 140. Navigation unit 160 calls up data stored in memory 142 via distributor device 140 to update the data stored in navigation data memory 162. If transceiver unit 110 receives returned information 1100 and, after comparison with the clock of the first timer, it is determined that first predefined time period 1401 has been exceeded, the message is generated and/or forwarded by distributor device 140 for use by other units or devices of wireless transceiver 100.

Results of the information processing in navigation unit 160 can be forwarded to playback devices 184 via distributor device 140 and made available there to a user of any type, visually or acoustically in particular.

The user inputs information via input devices 182, for example, a keyboard, for example, to have the wireless transceiver input navigation destinations and the like. Furthermore, the information about user request 1821 can be forwarded to a second information query 1001 via distributor device 140 to transceiver unit 110 using inputs devices 182. Transceiver unit 110 then transmits second information query 1001.

In the case where wireless transceiver 100 is set to automatically repeat information queries 1000, 1001, it can be determined by comparing a clock of a second timer assigned to analyzer circuit 120 that second predefined time period 1404 has been exceeded, the clock of the second timer having been restarted at the time of the transmission of first information query 1000. In this case, second information query 1001 is transmitted by transceiver unit 110.

Any number of returned information items 1100 can be received by the wireless transceiver in response to an information query 1000, 1001. This simplifies transmission and reception since it is not necessary to check for completeness. Processing of additional returned information 1100 takes place in the manner similar to the processing of returned information 1100 after the transmission of first information query 1000. Information transmitted by service provider 10 which does not originate from an information query 1000, 1001 of wireless transceiver 100 can also be processed by the wireless transceiver. In particular, important information such as traffic situation reports regarding a vehicle being driven in the wrong direction on a highway may be transmitted in such a mode of operation.

The method to according to the present invention and wireless transceiver 100 according to the present invention can be used for requesting and processing any type of information. In particular,. the method according to the present invention and wireless transceiver 100 according to the present invention are well suited for navigation information which facilitates navigation for a mobile user. In particular, the method according to the present invention and wireless transceiver 100 according to the present invention are well suited for use in a vehicle on land, water, or in the air. A further embodiment of the method according to the present invention and of wireless transceiver 100 according to the present invention for use in a land vehicle mainly on roads is possible. For navigation in a road network it is recommended that the location information and the possible connection options provided by the road network be stored in the road vehicle, which is made possible according to the present invention by storing first location information, in particular static information about the road network, in navigation data memory 162.

Navigation unit 160 according to the present invention includes means for determining the position of the vehicle at any time, for example, in regular time intervals. This is accomplished according to the present invention through analyses of a GPS system (Global Positioning System). Furthermore, additional data sources can be used for position determination, in particular velocity data, angle or orientation data, or the like. Velocity data can be provided by an onboard velocity sensor. Angle or orientation data can be provided, for example, by an angular acceleration sensor or the like. Navigation is made possible, in particular for users familiar with the area, through the possibility of location determination and the presence of stored first location information of the road network.

By supplementing the first location information of the road network with up-to-date information, for example, concerning the traffic conditions on certain stretches of road, improved navigation becomes possible, which allows time-optimized navigation in particular. For this purpose, information from service provider 10 is transmitted over wireless network 50 to wireless transceiver 100 located in the vehicle. The wireless network is designed, for example, as a bidirectional wireless network, in particular of the type of a mobile telephone network according to the GSM standard. Service provider 10 receives information queries 1000, 1001 of wireless transceiver 100 and transmits information 1100, in particular for payment.

In the exemplary embodiments, communication takes place over wireless network 50 between wireless transceiver 100 and service provider 10, in particular via short messages, for example SMS short messages according to the GSM standard or the like. Service provider 10 selects returned information 1100 from the information available, for example, concerning disturbances in the traffic flow in the road network or the like, as a function of information queries 1000, 1001. In the method according to the present invention, information queries 1000, 1001 contain second location information, for example, regarding the position of the vehicle, the areas on the intended route, or the like. Second location information may also be generated by wireless transceiver 100 on the basis of first location information. For example, when two different routes are considered in the navigation unit for optimizing navigation, the second location information of the respective information query 1000, 1001 can be configured so that returned information 1100 contains all traffic situation reports 1200 concerning the relevant road segments. Thus, the second information can also be generated on the basis of the position of wireless transceiver 100 and, at the same time, on the basis of the first information.

Using the second location information, service provider can put together the information requested and make it available to wireless transceiver 100 as returned information 1100. In particular, information queries 1000, 1001 concern areas in the extended vicinity of the stretches of the intended route.

Returned information 1100 may include one or more traffic situation reports 1200. Traffic situation reports 1200 may be transmitted in an encoded or unencoded form.

According to the present invention, traffic situation reports 1200 are encoded according to the TMC (Traffic Message Channel) code, which is defined in European preliminary standard ENV-278-4-1-0012, June 1996.

In the present embodiment, the service provider evaluates information queries 1000, 1001 using the second location information and compares the latter with the available traffic situation reports, in particular TMC messages or the like. If a TMC message corresponds to the second location information of information query 1000, 1001, it is forwarded in the form of an SMS short message to wireless transceiver 100. A plurality of Tmc messages can be transmitted in an SMS short message. TMC messages concern third location information (Location according to the TMC code) which is determined by fourth location information (PrimaryLocation, see TMC standard) and the extent of the traffic disturbance (Extent, see Tmc standard). A TMC message corresponds to the second location information when the third location information indicates point locations (Point Location, see TMC standard) and at least one of the third location information items affected by the TMC message is located in the area defined by the second location information of the information query. All the third location information items which are defined by the fourth location information and the extent of the traffic disturbance are affected by a message; the extent of disturbance may assume values between 0 and 31; thus, point locations may also be affected by a message 32.

The service provider may optimize its service quality by placing particularly important traffic situation reports 1200 at the beginning of returned information 1100. Less important traffic situation reports 1200 can be placed at the end of returned information 1100 or transmitted in additional returned information 1100 to wireless transceiver 100. Furthermore, the service provider-may reduce the complexity of its queries by keeping a limited amount of predefined queries available and calling them up on the basis of the queried second location information. Such an option exists as long as all the traffic situation reports 1200, rather than a predefined first number of traffic situation reports 1200, affected by the queried second location information are selected. In a further embodiment, the wireless transceiver according to the present invention may store only a predefined first number of, for example, one hundred, traffic situation reports. Thus an overflow occurs in the memory for traffic situation reports 1200 in wireless transceiver 100 if the service provider returns a larger number of traffic situation reports than the predefined first number. Wireless transceiver 100 does not recognize that traffic situation reports 1200 are also transmitted from areas outside the regions contiguous to second location information. All traffic situation reports 1200 contained in returned information 1100 are treated in the same way in wireless transceiver 100.

The service provider has the option of transmitting traffic situation reports 1200 once queried and transmitted, to wireless transceiver 100 without a new information query 1000, 1001. Thus, changes in the contents of traffic situation reports 1200 can also be communicated without a new information query 1000, 1001. It is, however, not ensured that traffic situation report is 1200 is also received and evaluated by wireless transceiver 100.. The service provider does not transmit any traffic situation reports 1200 whose life is less than a predefined minimum life 1220. Life 1240 of a traffic situation report 1200 can be represented, for example, by the ALERT-C-Persistence which is defined in the TMC code. In the method according to the present invention, minimum life 1220 is set at 30 minutes.

In order to counteract the danger of obsolete traffic situation reports stored in wireless transceiver 100, the service provider may terminate traffic situation reports 1200 whose life 1240 has been exceeded not by automatic deletion after the lapse of life 1240, but through an explicit delete message. Delete messages are also traffic situation reports 1200 according to the TMC standard and also have a life 1240 at least equal to minimum life 1220. Delete messages themselves can be removed after the lapse of life 1240 without any comments.

The service provider encodes returned information 1100 so that they have validity in wireless network 50 only for a period of time corresponding to a first validity time value 1402. According to the present invention, returned information 1100 is transmitted as an SMS short message according to the GSM standard, for example, to wireless transceiver 100. According to the GSM standard, an SMS short message can be provided with a validity time value (TP Validity-Period, see GSM standard document RE/SMG-040340PR4, October 1996). The validity time value of an SMS message may vary for a validity time value of up to 12 hours in multiples of five minutes in a certain encoding of the validity time value. For example, with the method according to the present invention and with wireless transceiver 100 according to the present invention, first validity time value 1402 is set at five minutes.

A buffer memory assigned to transceiver unit 110 can be provided in order to store returned information 1100 until analyzer circuit 120 is capable of evaluating returned information 1100 and traffic situation reports 1200 contained therein. A first processing of returned information 1100 takes place in analyzer circuit 120, where traffic situation reports 1200 can be decoded. The traffic situation reports 1200 can either be stored in memory 142 or, at least in part, output to the user with the aid of playback device 184 via distributor device 140.

Distributor device 140 recognizes in wireless transceiver 100 according to the present invention which traffic situation reports 1200 are relevant for navigation using signals of navigation unit .160 and sends these messages to navigation data memory 162 via navigation unit 160 as navigation messages 1300. On the basis of the information present in navigation data memory 162, both the first location information, in particular information concerning the road network, as well as the data from navigation messages 1300, the optimum route, which can be optimized in particular in terms of time, can be calculated in navigation unit 160.

In the present embodiment, first predefined time period 1401 is set at 13 minutes, for example. Second predefined time period 1404 which, when exceeded, causes second information query 1001 to be transmitted by wireless transceiver 100 is set in the present embodiment at 15 minutes, for example. Thus, the condition that first predefined time period 1401 is less than second predefined time period 1402 is met. First and second validity time values 1402, 1403 are set at five minutes, for example.

Minimum life 1220 is set in the present embodiment at 30 minutes. Thus, the condition that the minimum life is greater than the sum of first predefined time period 1401 and second predefined time period 1404 is met.

Returned information 1100 may reach wireless transceiver 100 either after first predefined time period 1401 after first information query 1000 has been transmitted or after second predefined time period 1404, so that returned information 1100 which was generated by service provider 10 on the basis of first information query 1000 is only received after second information query 1001 has been transmitted by wireless transceiver 100. As a result, first predefined time period 1401 was restarted by second information query 1001 and returned information 1100 belonging to first information query 1000 is assumed to be valid. This error cannot be recognized. It has a beneficial effect if traffic situation reports 1200 contained in returned information 1100 are not obsolete. Since returned information 1100 is stored in the wireless network according to second validity time value 1403 at the most, the likelihood that these traffic situation reports are current is high. In normal operation, the likelihood that traffic situation reports are available earlier in such a case is also high. The occurrence of errors may have an effect on the operation of wireless transceiver 100 according to the present invention.

In a further embodiment of the method according to the present invention and wireless transceiver 100 according to the present invention, information 1100 received by transceiver unit 110 of wireless transceiver 100 is not associated with information queries 1000, 1001, and traffic situation reports 1200 that are transmitted without information query 1000, 1001, for example via a cell broadcast short message service (CBS) of service provider 10, can also be processed. In this case information 1100 returned by service provider 10 is received within first predefined time period 1401 after first information query 1000 has been transmitted.

What is claimed is:

1. A method for requesting and processing information, comprising:
    transmitting by a wireless transceiver a first information query over a wireless network, the first information query being transmitted as a short message, the first information query being provided with a first predefined validity time value;
    transmitting information to the wireless transceiver in response to the first information query, the information being received by the wireless transceiver over the wireless network in a form of short messages, the information being provided with a second predefined validity time value by the service provider;
    registering in the wireless transceiver a time of the first information query; and
    generating a message when a first predefined time period after the transmitting of the first information query is exceeded.

2. The method of claim 1, wherein the wireless network is a mobile wireless network.

3. The method of claim 1, wherein the first information query is generated based on a position of the wireless transceiver.

4. The method of claim 1, further comprising:
    suppressing use of the transmitted information when the first predefined time period after the transmitting of the first information query is exceeded.

5. The method of claim 1, further comprising:
    automatically transmitting a second information query after transmitting the first information query and after a second predefined time period is exceeded, the second predefined time period starting at a time of the transmitting of the first information query, the first predefined time period being restarted at a time of the transmitting of the second information query, the second predefined time period being greater than the first predefined time period.

6. The method of claim 5, wherein the information includes traffic information.

7. The method of claim 5, wherein the information includes traffic information of a specific area.

8. The method of claim 5, wherein the information contains at least one traffic situation report, a life of the at least one traffic situation report exceeding a predefined minimum life.

9. The method of claim 8, wherein the at least one traffic situation report is according to a TMC standard.

10. The method of claim 8, wherein the predefined minimum life is greater than a sum of the first predefined time period and the second predefined time period.

11. The method of claim 8, further comprising:
    selecting at least one navigation message from the at least one traffic situation report in a distributor device, the selected at least one navigation message being made available to a navigation unit.

12. The method of claim 1, further comprising:
    transmitting upon user request a second information query after transmitting the first information query; and
    restarting the first predefined time period at a time of the transmitting of the second information query.

13. A wireless transceiver operating over a wireless network, comprising:
    a transmitter to transmit a first information query as a short message over the wireless network, the first information query being provided with a first predefined validity time value;
    a receiver to receive information responsive to the first information query, the information being received as a short message over the wireless network;
    an arrangement to register a time of the first information query;
    an arrangement to generate a message after a first predefined time period after the first information query is transmitted is exceeded;
    an arrangement to automatically transmit a second information query after a second predefined time period has been exceeded;

an arrangement to start the second predefined time period at a time when the first information query is transmitted; and an arrangement to restart the first predefined time period at a time when the second information query is transmitted;

wherein the second predefined time period is greater than the first predefined time period.

14. The wireless transceiver of claim 13, wherein the information includes at least one traffic situation report.

15. The wireless transceiver of claim 14, further comprising:

a memory to store the at least one traffic situation report.

16. The wireless transceiver of claim 14, further comprising:

an arrangement configured to select a navigation message from the traffic situation report and for making the navigation message available to a navigation unit.

17. The wireless transceiver of claim 13, further comprising:

an arrangement to transmit a second information query upon user request; and an arrangement restart the first predefined time period at a time when the second information query is transmitted.

18. The wireless transceiver of claim 13, further comprising:

an arrangement configured to determine a position of the wireless transceiver.

19. The wireless transceiver of claim 13, further comprising:

an arrangement configured to determine a position of the wireless transceiver in a road network.

20. The wireless transceiver of claim 13, further comprising:

an arrangement configured to generate and transmit the first information query based on a position of the wireless transceiver.

21. A method for requesting and processing information, comprising:

transmitting by a wireless transceiver a first information query over a wireless network, the first information query being transmitted as a short message, the first information query being provided with a first predefined validity time value;

transmitting information to the wireless transceiver in response to the first information query, the information being received by the wireless transceiver over the wireless network in a form of short messages, the information being provided with a second predefined validity time value by the service provider;

registering in the wireless transceiver a time of the first information query; and at least one of generating a message and suppressing the use of the received information when a first predetermined time period after the transmission of the first information query is exceeded.

22. The method of claim 20, wherein the wireless network includes a mobile wireless network.

23. The method of claim 21, wherein the first information query is generated based on a position of the wireless transceiver.

24. The method of claim 21, further comprising:

suppressing use of the transmitted information when the first predefined time period after the transmitting of the first information query is exceeded.

25. The method of claim 21, further comprising:

automatically transmitting a second information query after transmitting the first information query and after a second predefined time period is exceeded, the second predefined time period starting at a time of the transmitting of the first information query, the first predefined time period being restarted at a time of the transmitting of the second information query, the second predefined time period being greater than the first predefined time period.

26. The method of claim 25, wherein the information includes traffic information.

27. The method of claim 25, wherein the information includes traffic information of a specific area.

28. The method of claim 25, wherein the information contains at least one traffic situation report, a life of the at least one traffic situation report exceeding a predefined minimum life.

29. The method of claim 28, wherein the at least one traffic situation report is according to a TMC standard.

30. The method of claim 28, wherein the predefined minimum life is greater than a sum of the first predefined time period and the second predefined time period.

31. The method of claim 28, further comprising:

selecting at least one navigation message from the at least one traffic situation report in a distributor device, the selected at least one navigation message being made available to a navigation unit.

32. The method of claim 21, further comprising:

transmitting upon user request a second information query after transmitting the first information query; and restarting the first predefined time period at a time of the transmitting of the second information query.

33. A wireless transceiver operating over a wireless network, comprising:

a transmitter to transmit a first information query as a short message over the wireless network, the first information query being provided with a first predefined validity time value;

a receiver to receive information responsive to the first information query, the information being received as a short message over the wireless networks an arrangement to register a time of the first information query;

an arrangement to at least one of generate a message and suppress the use of the received information when a first predetermined time period after the transmission of the first information query is exceeded;

an arrangement to automatically transmit a second information query after a second predefined time period has been exceeded;

an arrangement to start the second predefined time period at a time when the first information query is transmitted; and an arrangement to restart the first predefined time period at a time when the second information query is transmitted;

wherein the second predefined time period is greater than the first predefined time period.

34. The wireless transceiver of claim 33, wherein the information includes at least one traffic situation report.

35. The wireless transceiver of claim 34, further comprising:

a memory to store the at least one traffic situation report.

36. The wireless transceiver of claim 34, further comprising:

an arrangement to select a navigation message from the traffic situation report and to make the navigation message available to a navigation unit.

37. The wireless transceiver of claim 33, further comprising:
- an arrangement to transmit a second information query upon user request; and
- an arrangement to restart the first predefined time period at a time when the second information query is transmitted.

38. The wireless transceiver of claim 33, further comprising:
- an arrangement to determine a position of the wireless transceiver.

39. The wireless transceiver of claim 33, further comprising:
- an arrangement to determine a position of the wireless transceiver in a road network.

40. The wireless transceiver of claim 33, further comprising:
- an arrangement to generate and transmit the first information query based on a position of the wireless receiver.

* * * * *

UNITED STATES PATENT AND TRADEMARK OFFICE
CERTIFICATE OF CORRECTION

| | | |
|---|---|---|
| PATENT NO. | : 7,072,676 B1 | Page 1 of 1 |
| APPLICATION NO. | : 09/856989 | |
| DATED | : July 4, 2006 | |
| INVENTOR(S) | : Hessing et al. | |

It is certified that error appears in the above-identified patent and that said Letters Patent is hereby corrected as shown below:

Column 1, line 7, change "invention related to" to --invention relates to--

Column 7, line 21, change "service provider" to --service provider 10--

Column 7, line 42, change "Tmc messages" to --TMC--

Column 7, line 47, change "See Tmc standard)." to --See TMC standard)--

Column 9, line 2, change "investigation unit - 160" to --investigation unit 160--

Column 11, line 59, change "The method of claim 20," to --The method of claim 21--

Signed and Sealed this

Fourteenth Day of November, 2006

JON W. DUDAS
*Director of the United States Patent and Trademark Office*